(12) United States Patent
Ahmad Mughal et al.

(10) Patent No.: US 11,264,836 B2
(45) Date of Patent: Mar. 1, 2022

(54) WIRELESS KINETIC CHARGER

(71) Applicants:Rabia Ahmad Mughal, Doha (QA); Zaid Ahmad Mughal, Doha (QA)

(72) Inventors: Rabia Ahmad Mughal, Doha (QA); Zaid Ahmad Mughal, Doha (QA)

( * ) Notice: Subject to any disclaimer, the term of this patent is extended or adjusted under 35 U.S.C. 154(b) by 101 days.

(21) Appl. No.: 16/610,493

(22) PCT Filed: May 2, 2018

(86) PCT No.: PCT/IB2018/053041
§ 371 (c)(1),
(2) Date: Nov. 1, 2019

(87) PCT Pub. No.: WO2018/203251
PCT Pub. Date: Nov. 8, 2018

(65) Prior Publication Data
US 2020/0153276 A1    May 14, 2020

Related U.S. Application Data

(60) Provisional application No. 62/500,001, filed on May 2, 2017.

(51) Int. Cl.
| | | |
|---|---|---|
| *H02J 50/00* | (2016.01) | |
| *H02J 50/10* | (2016.01) | |
| *H02J 50/90* | (2016.01) | |
| *H01F 38/14* | (2006.01) | |
| *H02J 7/00* | (2006.01) | |

(52) U.S. Cl.
CPC .............. *H02J 50/10* (2016.02); *H01F 38/14* (2013.01); *H02J 7/0044* (2013.01); *H02J 50/90* (2016.02)

(58) Field of Classification Search
CPC ........................................................ H02J 50/10
USPC ........................................................ 320/108
See application file for complete search history.

(56) References Cited

U.S. PATENT DOCUMENTS

| 7,471,062 | B2 | 12/2008 | Bruning | |
|---|---|---|---|---|
| 2004/0212475 | A1* | 10/2004 | Schumacher | ......... H01F 41/046 336/200 |
| 2008/0100164 | A1 | 5/2008 | Okazaki et al. | |
| 2008/0122312 | A1* | 5/2008 | Dickson | ................. H02K 35/02 310/268 |
| 2008/0157912 | A1 | 7/2008 | Tung et al. | |

(Continued)

FOREIGN PATENT DOCUMENTS

| EP | 2573900 A1 | 3/2013 |
|---|---|---|
| EP | 3089176 A1 | 11/2016 |
| WO | 2009/140221 A9 | 11/2009 |

OTHER PUBLICATIONS

International search report for PCT/IB2018/053041, dated Sep. 6, 2018, 2 pages.

(Continued)

*Primary Examiner* — Edward Tso
*Assistant Examiner* — Ahmed H Omar
(74) *Attorney, Agent, or Firm* — Danielson Legal LLC (57) ABSTRACT

A power unit and method of manufacturing a power unit. The power unit may include one or more inductors arranged in an alternating pole configuration. The inductors are attached to a circuit board to form an electrical generator configured to provide electrical energy to a wireless charger. The wireless charger may be detached from the generator.

22 Claims, 11 Drawing Sheets

(56) References Cited

U.S. PATENT DOCUMENTS

| | | | |
|---|---|---|---|
| 2008/0174120 A1 | 7/2008 | Gardner et al. | |
| 2009/0179610 A1 | 7/2009 | Lin | |
| 2009/0284082 A1* | 11/2009 | Mohammadian | G06K 7/10178 |
| | | | 307/104 |
| 2011/0156501 A1* | 6/2011 | Peng | H02K 35/02 |
| | | | 310/28 |
| 2013/0020875 A1 | 1/2013 | Wozniak | |
| 2013/0088082 A1 | 4/2013 | Kang et al. | |
| 2013/0285601 A1* | 10/2013 | Sookprasong | H02J 7/02 |
| | | | 320/108 |
| 2014/0103858 A1 | 4/2014 | Bertsch et al. | |
| 2014/0167690 A1* | 6/2014 | Ting | H02J 50/80 |
| | | | 320/108 |
| 2015/0028800 A1 | 1/2015 | Kim | |
| 2015/0076928 A1* | 3/2015 | Immonen | H02K 35/02 |
| | | | 310/10 |
| 2015/0238357 A1 | 8/2015 | Goldberg et al. | |
| 2016/0172870 A1 | 6/2016 | Blum et al. | |

OTHER PUBLICATIONS

Written opinion for PCT/IB2018/053041, dated Sep. 6, 2018, 7 pages.

* cited by examiner

WIRELESS KINETIC CHARGER

CROSS-REFERENCE TO RELATED APPLICATIONS

This application is a national phase of International (PCT) Patent Application No. PCT/IB2018/053041, filed internationally on May 2, 2018, which itself claims priority to U.S. Provisional Application No. 62/500,001, filed on May 2, 2017, the entire disclosure of each of which is hereby incorporated by reference as if set forth in their entirety herein.

TECHNICAL FIELD

Embodiments described herein generally relate to power units and methods of manufacturing power units and, more particularly but not exclusively, to power units and methods of manufacturing power units configured to provide energy to a wireless charger.

BACKGROUND

Electronic devices and gadgets have become ubiquitous in modern times. Devices including gaming devices, cellphones, and computers have been designed for portability and on-the-go use. Many of these devices are equipped with rechargeable batteries which, depending on the frequency and duration of the device usage, may only last a few hours without charge.

With traditional recharging devices, a consumer may need to plug their device into a wall outlet to charge their device. Thus, the mobility of the device would be negated during the charging process, as the device would need to be attached to the wall outlet to achieve a recharged battery.

Other recharging devices create only a temporary fix. Portable power banks, wireless chargers, and renewable battery packs can be charged separately and then plugged into the device to recharge the device's battery. However, these portable recharging devices are not a sustainable solution as they eventually require energy from a wall outlet that has an alternating current (AC) power source. They simply offer a process for plugging a device into a wall outlet to charge, but one step removed.

Some recharging devices can be charged by solar cell or magnetic resonance power. However, these recharging devices can often be slow or otherwise inefficient. Accordingly, existing techniques are generally directed towards generating and providing power, but in an inefficient or inconvenient manner.

A need exists, therefore, for methods and systems that overcome the disadvantages of existing techniques and devices.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

In one aspect, embodiments relate to a power unit. The power unit includes a wireless charger and an electrical generator in operable connectivity with the wireless charger. The electrical generator may be configured to convert a first energy into electrical energy and provide the electrical energy to the wireless charger, wherein the electrical generator comprises a plurality of inductors arranged in an alternating pole configuration.

In some embodiments, the plurality of inductors is arranged in at least one of a cylindrical, spherical, elliptical, or toroidal conformation.

In some embodiments, each of the plurality of inductors has a length of at least 30 mm.

In some embodiments, each of the plurality of inductors is comprised of a number of coil turns.

In some embodiments, a core material of each of the plurality of inductors is comprised of at least one of plastic (PLA), or a ferromagnetic material including at least one of iron, cobalt, nickel, or magnetite.

In some embodiments, each of the plurality of inductors includes at least one centrally located neodymium magnet. In some embodiments, the at least one centrally located neodymium magnet has a length of at least 10 mm.

In some embodiments, the power unit is portable.

In some embodiments, the power unit further includes a storage cell, and the generator provides the electrical energy to the wireless charger through the storage cell.

In some embodiments, the wireless charger is detachable from the electrical generator.

In some embodiments, the wireless charger is configured to transfer energy to an external receiver through induction.

In some embodiments, the power unit further includes a switching sensor, wherein the switching sensor is configured to detect when the wireless charger is in operable connectivity with the external receiver; enable the transfer of energy to the external receiver upon detecting the wireless charger is in operable connectivity with the external receiver; and stop the transfer of energy upon detecting the wireless charger is not in operable connectivity with the external receiver.

In some embodiments, the first energy is kinetic energy received from motion in a number of axes.

In some embodiments, at least one of the wireless charger and the electrical generator has at least one external surface at least partially configured with a non-slip material.

According to another aspect, embodiments relate to a method of manufacturing a power unit. The method includes arranging a plurality of inductors in an alternating pole configuration; attaching the plurality of inductors to a circuit board, wherein the plurality of inductors and the circuit board form an electrical generator; and connecting the electrical generator to a wireless charger, such that the electrical generator is in operable connectivity with the wireless charger and is configured to provide electrical energy to the wireless charger.

In some embodiments, the electrical generator is configured to convert kinetic energy into the electrical energy.

In some embodiments, the wireless charger is detachable from the electrical generator.

In some embodiments, the plurality of inductors is arranged in at least one of a cylindrical, spherical, elliptical, or toroidal conformation.

In some embodiments, each of the plurality of inductors has a length of at least 30 mm.

In some embodiments, each of the plurality of inductors is comprised of a number of coil turns.

In some embodiments, a core material of each of the plurality of inductors is comprised of at least one of plastic (PLA), or a ferromagnetic material including at least one of iron, cobalt, nickel, or magnetite.

In some embodiments, each of the plurality of inductors includes at least one centrally located neodymium magnet.

In some embodiments, the method further includes connecting the electrical generator to a storage cell.

In some embodiments, the wireless charger is configured to transfer energy to an external receiver through induction. In some embodiments, the external receiver is a cell phone.

According to yet another aspect, embodiments relate to a power unit. The power unit includes a wireless charger and an electrical generator in operable connectivity with the wireless charger, the electrical generator configured to convert a first energy into electrical energy and provide the electrical energy to the wireless charger, wherein the electrical generator comprises at least one inductor and the electrical generator is detachable from and reattachable to the wireless charger.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The accompanying figures are schematic and not intended to be drawn to scale. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

The present application describes a power unit including a wireless charger and an electrical generator in operable connectivity with the wireless charger. The present application also describes a method of manufacturing the power unit. The power unit in accordance with various embodiments may be portable, such that it may be used to charge an electronic device during travel. In some embodiments, the power unit may operate as a portable power bank, comprising a detachable wireless battery or other storage cell capable of storing energy and wirelessly transferring energy.

The power unit described herein may use an electrical generator to convert kinetic energy into electrical energy to be stored for later transfer to an external electronic device via the wireless charger. In some embodiments, the power unit may use a thermocouple-type generator or a photovoltaic-type generator to generate electrical energy to be stored for later transfer to an external electronic device via the wireless charger. The need for wires, plugs, and sockets to charge external devices may be eliminated because the power unit may wirelessly transfer the energy to an external electronic device.

The electrical generator may harvest and convert energy (e.g., kinetic energy) into electrical energy by means of electromagnetic induction. In some embodiments, a cylindrical inductive coil contains both a suspended central magnet and at least one end-cap magnet. The suspended central magnet and the end-cap magnet may be positioned with opposite polarity such that the central magnet is continuously repelled and moving if the power unit or electrical generator is in motion. This movement therefore creates a change in magnetic flux produced by the central magnet, which produces a current through the cylindrical inductive coil of an inductor. This current may generate enough power to charge the wireless charger. In some embodiments, the wireless charger comprises a battery or other storage cell. In some embodiments, the battery is a lithium ion battery.

The electrical generator may also operate as an energy harvester. In these embodiments, the energy harvester may be a single-dimensional energy harvester configured to detect movement in only one direction. The energy harvester may also be a multi-dimensional energy harvester, configured to detect movement in multiple directions. In some embodiments, the energy harvester may generate and store energy from every direction in which it is configured to detect movement.

In some embodiments, a multi-dimensional energy harvester may be able to generate and store energy from multiple directions. For example, the energy harvester may be sensitive enough to detect, generate, and/or store energy from vibrational movements of a moving vehicle. In some embodiments, a first inductor may be positioned to vibrate within a vertical plane and a second inductor may be positioned to vibrate within a horizontal plane. The multi-dimensional energy harvester may be configured to generate and store energy from both the first and second inductors, each harvesting energy from a different direction. Some embodiments of the multi-dimensional energy harvester may use a plurality of inductors, each on different planes, to generate and store energy from a plurality of directions. The electrical generator may also be able to detect, generate, and/or store energy when it is not charged. The electrical generator may also be able to transmit energy to the wireless charger when it has not been fully charged.

The wireless charger may include a wireless transmitter. In some embodiments, the wireless transmitter may be a Qi universal wireless transmitter and may transfer power from the storage cell in the wireless charger to a device with a supported receiver.

In some embodiments, the wireless transmitter may operate with inductive coupling. For example, the Qi standard developed by the Wireless Power Consortium is an open interface that implements wireless power transfer through inductive coupling. The wireless transmitter may include a transmitting coil configured to transmit power to a receiving coil located in an external electronic device. In some embodiments, the transmitting coil may be configured to generate a magnetic field. The magnetic field, in some embodiments, may induce an alternating current in the receiving coil. The alternating current may then charge the receiving battery or other storage cell.

In some embodiments, the power unit may have a smart switching sensor to detect when the wireless charger of the power unit is in operable connectivity with the external receiver. If the wireless charger is not in operable connectivity with the receiver such that the receiver would not receive energy from the wireless charger if energy was transmitted therefrom, the smart switching sensor may stop energy transmission from the power unit or the wireless charger within the power unit. If a receiver subsequently comes within range of the wireless charger such that the receiver would receive energy from the power unit if the energy was transmitted, the smart switching sensor may enable energy transmission from the power unit. If the receiver then subsequently leaves range of the power unit, the smart switching sensor may then resume blocking energy transmission.

Figure 1:
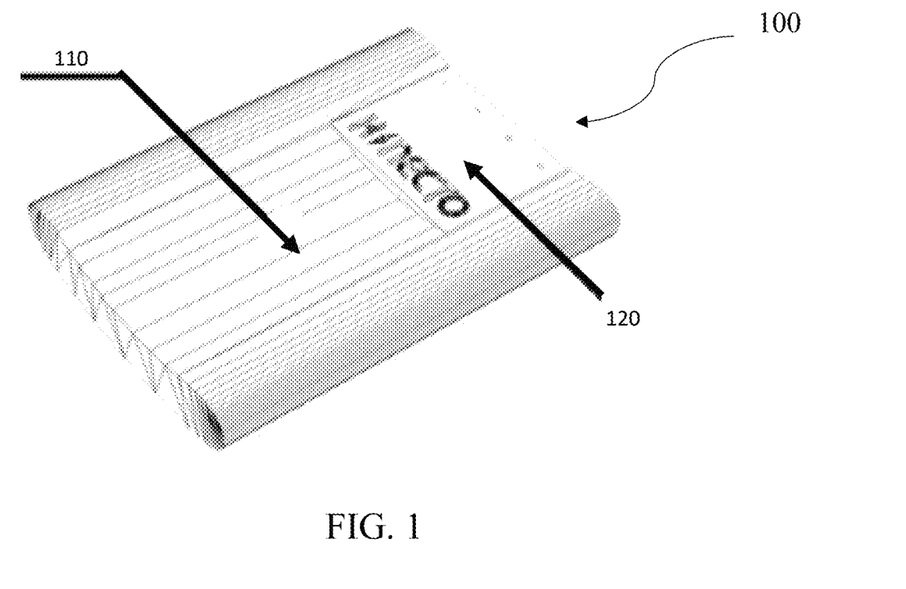
FIG. 1 illustrates a power unit having an electrical generator and a detachable wireless charger in accordance with one embodiment.

FIG. 1 illustrates a power unit 100 having an electrical generator 110 and a detachable wireless charger 120 in accordance with one embodiment. As seen in FIG. 1, the wireless charger 120 may be in operable connectivity with the electrical generator 110.

The electrical generator 110 may be configured to generate electrical energy by harvesting kinetic energy. The electrical generator 110 may also be configured as, for example, a thermocouple-type generator or a photovoltaic-type generator. The electrical generator 110 may contain one or more inductors that convert kinetic energy into electrical energy to be transferred to the wireless charger 120.

The electrical generator 110 may be configured to convert a first energy into electrical energy. The first energy may be kinetic energy, heat energy, or light energy. The electrical generator 110 may also be configured to convert multiple types of energy, including but not limited to light, heat, and kinetic energy, into electrical energy. Once the electrical generator 110 has converted a first energy into electrical energy, the electrical generator 110 may transfer the electrical energy to the wireless charger 120 for storage.

The wireless charger 120 may be configured to detach from the electrical generator 110. The wireless charger 120 may be configured to charge an external electronic device. The wireless charger 120 may charge the external electronic device when the wireless charger 120 is either attached to or detached from the electrical generator 110. The wireless charger 120 may transfer electric energy to the external electronic device through induction or other wireless transfer methods.

Figure 2A:
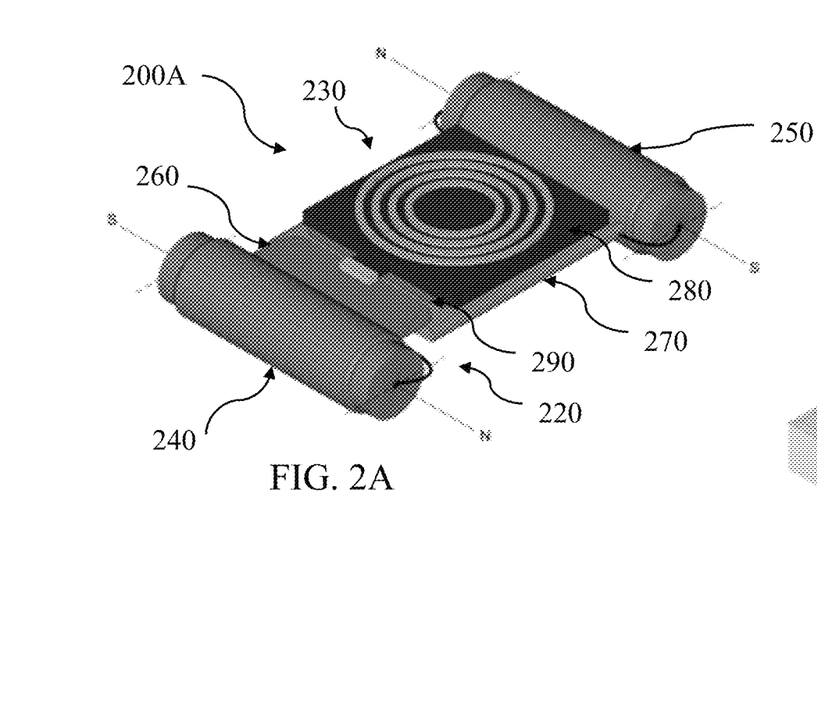
FIG. 2A illustrates a multiple inductor power unit in accordance with one embodiment.
Figure 2B:
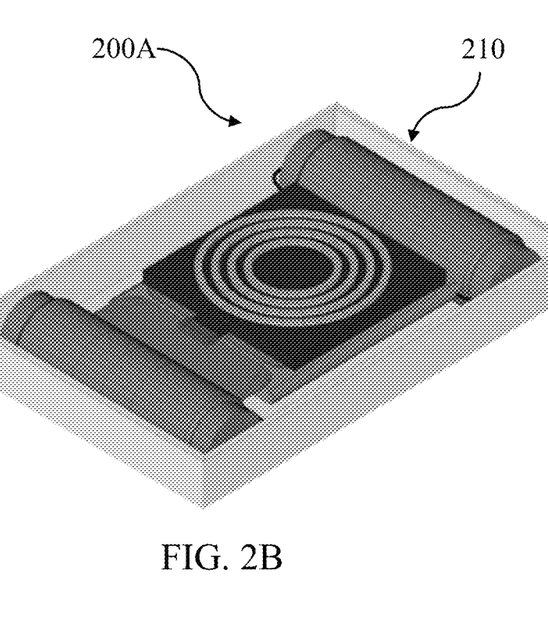
FIG. 2B illustrates the multiple inductor power unit of FIG. 2A in a housing in accordance with one embodiment.
Figures 2C, 2D:
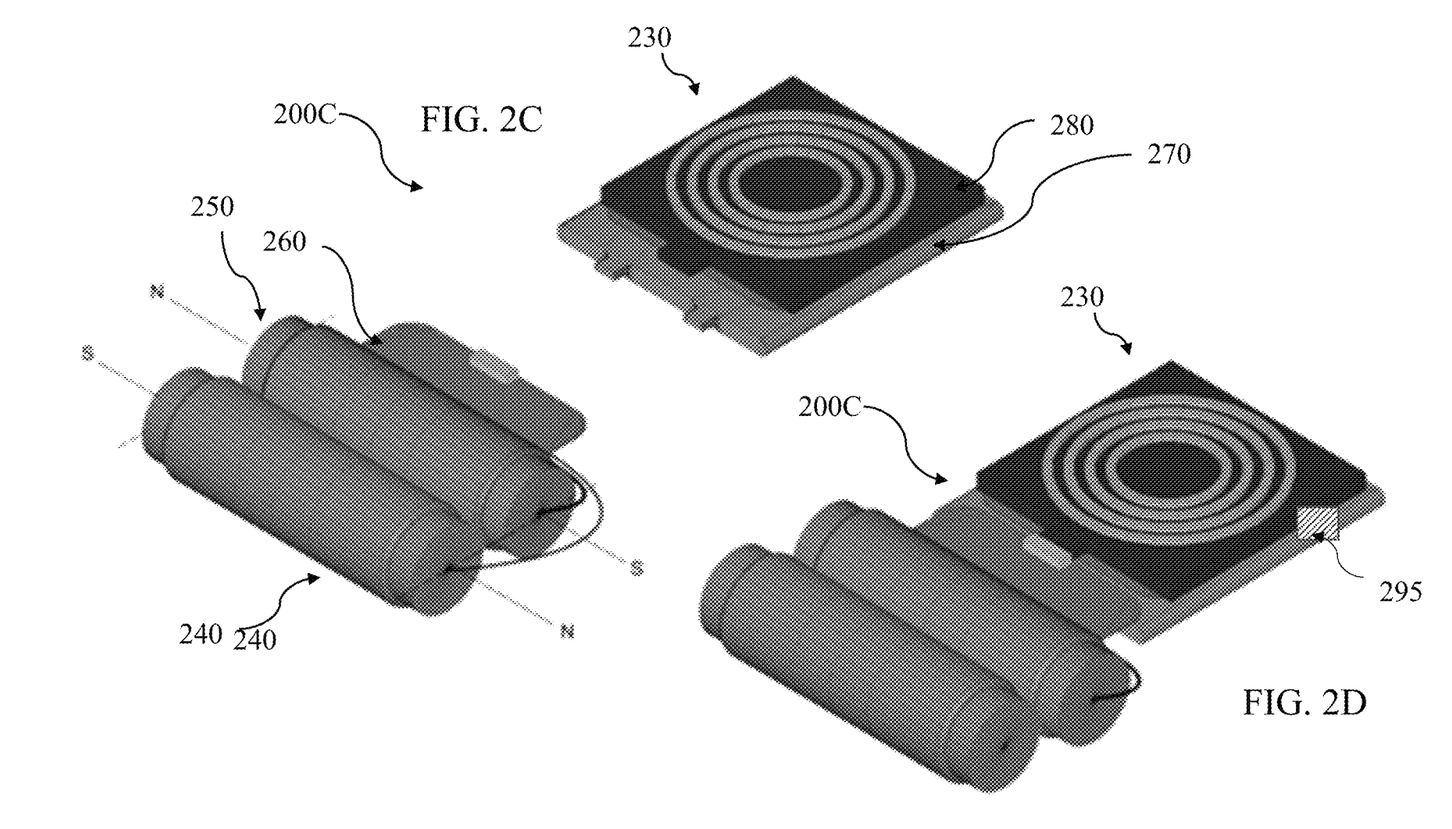
FIG. 2C illustrates a multiple inductor power unit in a detached form in accordance with one embodiment.
FIG. 2D illustrates the multiple inductor power unit of FIG. 2C in an attached form in accordance with one embodiment.

FIG. 2A illustrates a multiple inductor power unit 200A in accordance with one embodiment. FIG. 2B illustrates the multiple inductor power unit 200A of FIG. 2A in a housing 210 in accordance with one embodiment. FIG. 2C illustrates a multiple inductor power unit 200C in a detached form in accordance with one embodiment. FIG. 2D illustrates the detachable multiple inductor power unit 200C of FIG. 2C in an attached from in accordance with one embodiment.

The power unit 200A of FIG. 2A includes an electrical generator 220 and a wireless charger 230. As seen in FIG. 2A, the electrical generator 220 includes inductors 240, 250, and a printed circuit board 260. The electrical generator 220 may contain a single inductor 240 or a plurality of inductors 240, 250. In some embodiments, the electrical generator 220 may contain two inductors 240, 250, or more than two inductors.

The wireless charger 230 may include at least one battery or other storage cell 270 and a wireless transmitter 280. In some embodiments, the battery or other storage cell 270 may be a lithium ion battery. As seen in FIG. 2A, the wireless transmitter 280 may be attached to a printed circuit board 290.

FIG. 2B illustrates the power unit 200A of FIG. 2A positioned in a housing unit 210. In some embodiments, the power unit 200A may have a plurality of inductors 240, 250 positioned in the housing unit 210.

In some embodiments, the wireless charger 230 may be detached from the electrical generator 220, as shown in FIG. 2C. The wireless charger 230 may then be reattached to the electrical generator 220, as shown in FIG. 2D.

Referring back to FIG. 2B, at least a portion of the housing unit 210 may be configured with a non-slip surface. The non-slip surface may comprise PU Gel and/or Nano-suction technology. However, the non-slip surface may be made of any of a plurality of materials, as would be recognized by one skilled in the art.

In some embodiments, the non-slip surface may be configured such that the surface may be used to position an external device receiving energy from the wireless charger 230. For example, there may be a position for an external device to receive energy from the wireless charger 230 through inductive coupling.

The plurality of inductors may be arranged in an alternating pole configuration. As shown in FIG. 2A, the inductors 240 and 250 may have a north pole and a south pole and may be arranged such that the north pole of inductor 240 and the south pole of inductor 250 align across the power unit 200A. This arrangement may reduce interference between the inductors 240, 250 and may utilize insulation to increase the current converted to electrical energy in the electrical generator 220. This, in turn, increases the amount of electrical energy stored in the storage cell 270.

The inductors 240 and 250 may be arranged in different configurations. By way of example, the inductors 240 and 250 may be arranged in at least one of a cylindrical, spherical, elliptical, or toroidal configuration. The inductors 240 and 250 may be positioned next to each other, as shown in FIGS. 2C-D, or may be separated by the wireless transmitter 280 as shown in FIGS. 2A-B. In some embodiments, the power unit 200A, 200C may have four or more inductors, with a plurality of inductors on either side of the wireless transmitter 280.

In some embodiments, the power unit 200A or 200C may also include a switching sensor 295. The switching sensor 295 may detect when the wireless charger 230 is in operable connectivity with an external electronic receiver, such as a cell phone or other device receiving charge from the wireless charger 230. In the context of the present application, "operable connectivity" may refer to the positioning of the wireless charger 230 and the external electronic receiver such that the wireless charger 230 can transmit energy to the external electronic receiver and the external electronic receiver can receive the transmitted energy from the wireless charger 230.

The switching sensor 295 may therefore enable the transfer of energy to the external electronic receiver upon detecting that the wireless charger 230 is in operable connectivity with the external electronic receiver (e.g., within a predetermined distance from the receiver). Similarly, the switching sensor 295 may stop the transfer of energy upon detecting the wireless charger 230 is not in operable connectivity with the external receiver (e.g., outside a predetermined distance from the external receiver). The switching sensor 295 may then resume the transfer of energy to the external receiver upon detecting that the wireless charger 230 has resumed operable connectivity with the external receiver.

The switching sensor 295 may be configured to automatically start/stop the transfer of energy. In some embodiments, the switching sensor 295 may be manually activated. In some embodiments, the switching sensor 295 may be located on the housing unit 210. In other embodiments, the switching sensor 295 may be located in the housing unit 210.

Figure 3:
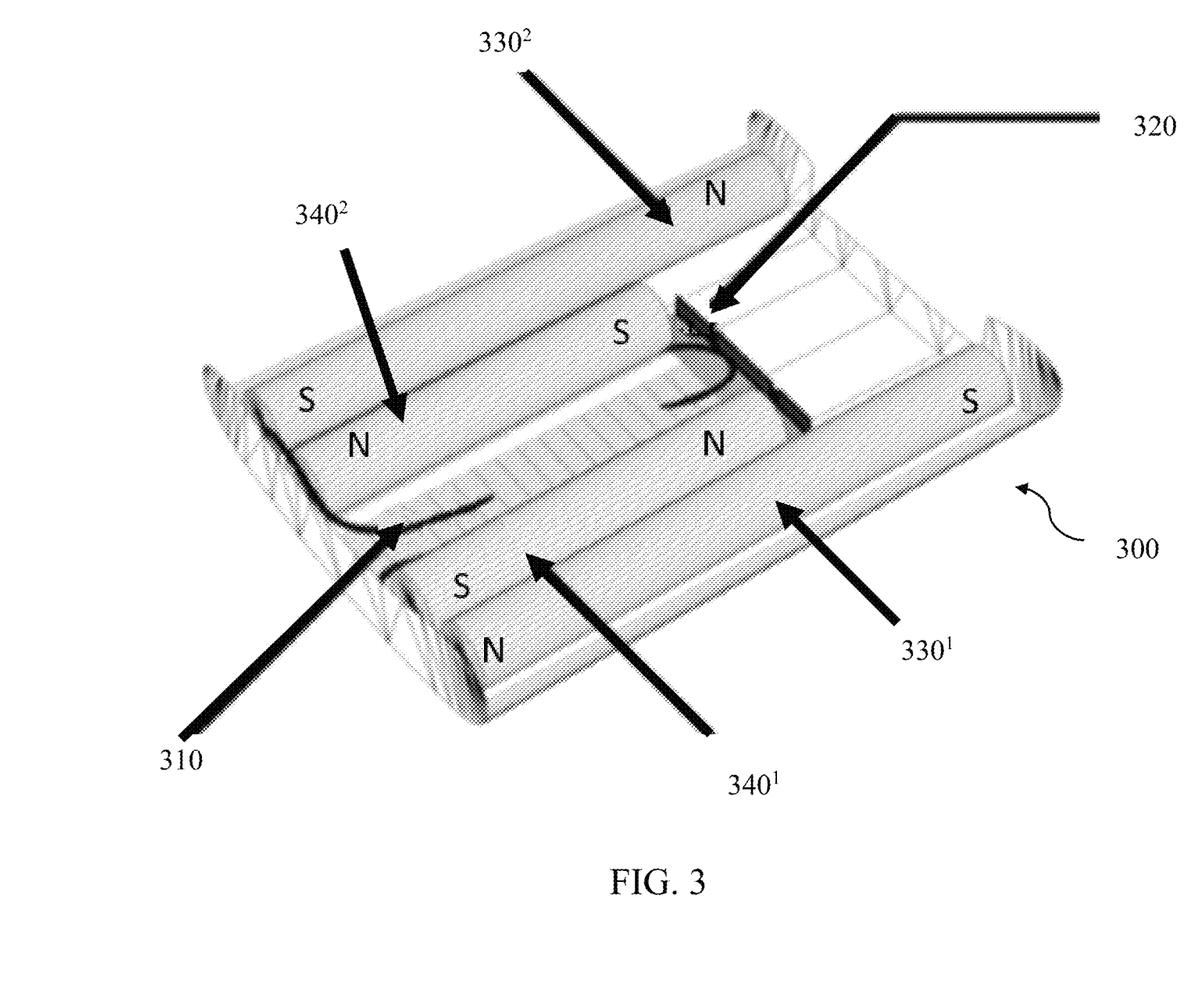
FIG. 3 illustrates a multiple inductor power unit attached to a circuit board in accordance with one embodiment.

FIG. 3 illustrates a multiple inductor power unit 300 configured with a circuit board 310 in accordance with one embodiment. FIG. 3 also shows a battery compartment 320 and a plurality of inductors $330^1$, $330^2$, $340^1$ and $340^2$. In some embodiments, the inductors $330^1$, $330^2$, $340^1$ and $340^2$ may be placed with alternating poles (shown in FIG. 3 as N and S poles) to avoid interference and utilize insulation between the inductors $330^1$, $330^2$, $340^1$ and $340^2$. This configuration of multiple inductors $330^1$, $330^2$, $340^1$ and $340^2$ reduces interference among the plurality of inductors $330^1$, $330^2$, $340^1$ and $340^2$, which leads to an overall increase in current capture.

By way of example, FIG. 3 illustrates the power unit 300 with large inductors $330^1$, $330^2$ and small inductors $340^1$, $340^2$. In some embodiments, the inductors $330^1$, $330^2$, $340^1$ and $340^2$ may have a length of at least 30 mm. In some embodiments, the large inductors $330^1$, $330^2$ may have a length of at least 125 mm or a length of at least 155 mm. In some embodiments, the small inductors $330^1$, $330^2$ may have a length of at most 125 mm or a length of at most 155 mm. At least one inductor $330^1$, $330^2$, $340^1$ and $340^2$ may be attached to the circuit board 310, which may have a length of approximately 125 mm.

As seen in FIG. 3, a small inductor $340^1$, $340^2$ may be arranged next to a large inductor $330^1$, $330^2$. The poles of the small inductors $330^1$, $330^2$ may be arranged in the opposite configuration with respect to the poles of the large inductors $340^1$, $340^2$, such that the south pole of the large inductors $330^1$, $330^2$ may be adjacent to or even touching the north pole of the small inductors $340^1$, $340^2$.

In some embodiments, at least one of the small inductors $340^1$, $340^2$ may be a 2,000 nHenry inductor. In some embodiments, at least one of the large inductors $330^1$, $330^2$ may be a 4,000 nHenry inductor and have an inductance of approximately twice the small inductors $340^1$, $340^2$.

Figure 6:
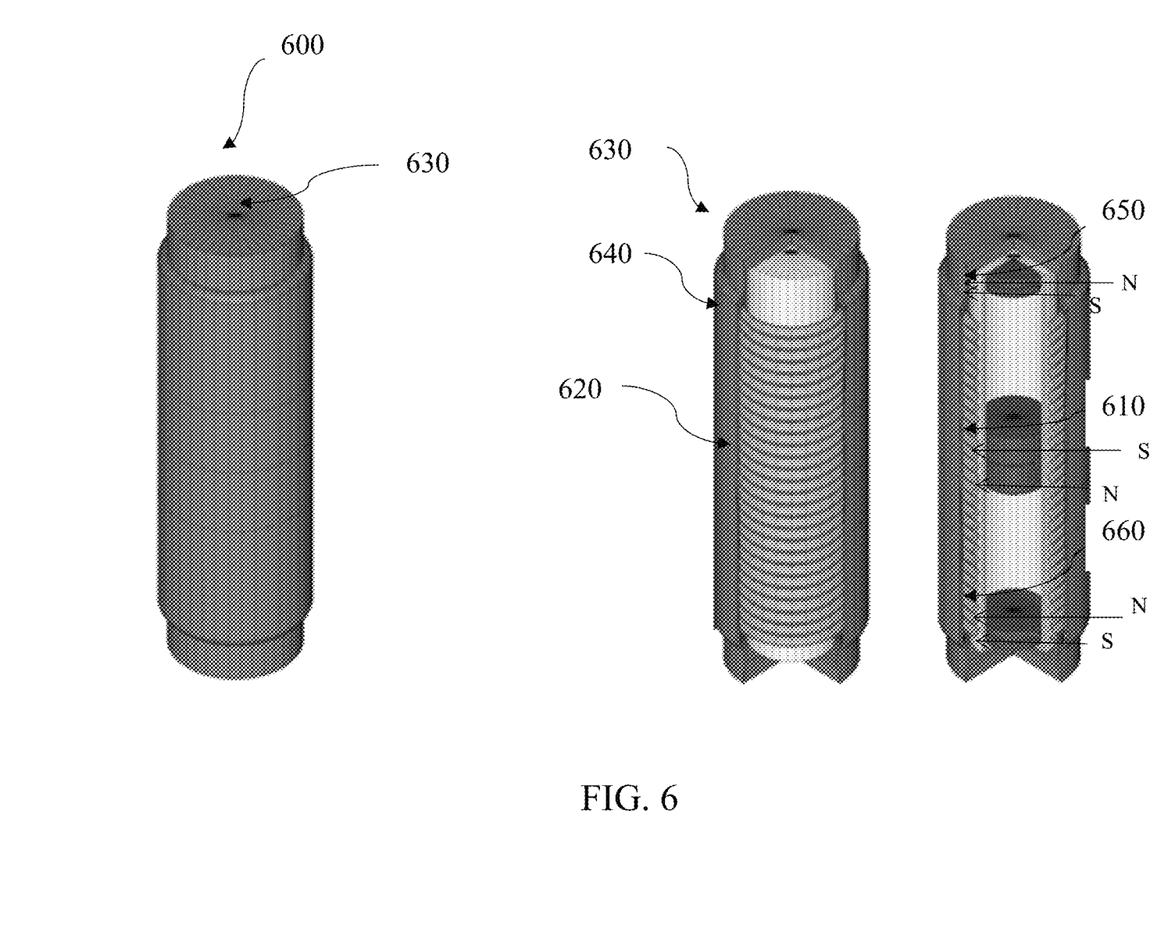
FIG. 6 illustrates an inductor having a central magnet and coil in accordance with one embodiment.

The inductors $330^1$, $330^2$, $340^1$ and $340^2$ may each have a central neodymium magnet (shown in FIG. 6). In some embodiments, all inductors $330^1$, $330^2$, $340^1$ and $340^2$ may have a central neodymium magnet.

The motion of the central neodymium magnet may generate a current within the coil of the inductors(s). This current may be transferred to the battery or other storage cell 410 of the wireless charger (shown in FIG. 4). The battery or other storage cell 410 of the wireless charger may be attached to the multiple inductor power unit 300 at the battery compartment 320.

Figure 4:
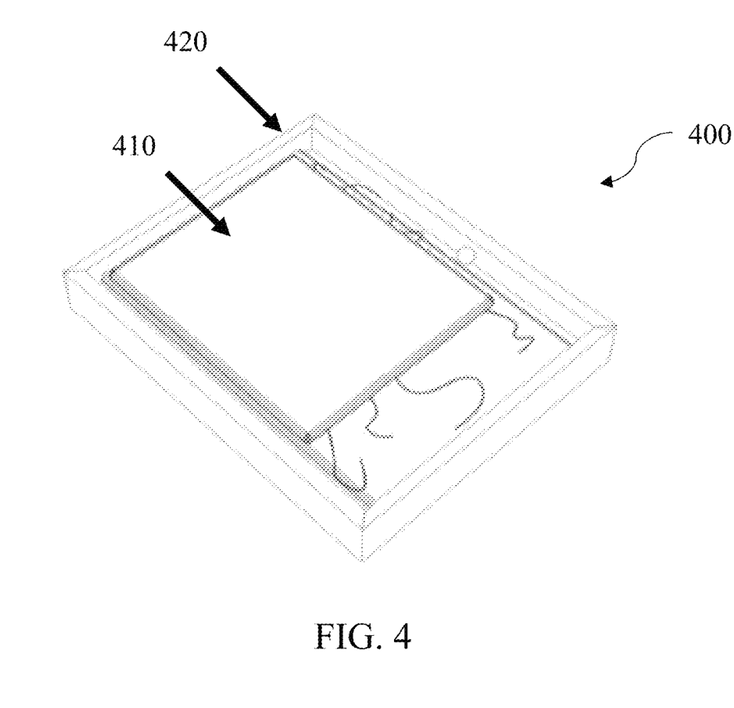
FIG. 4 illustrates a storage cell housed in a wireless charger in accordance with one embodiment.

FIG. 4 illustrates a wireless charger 400 in accordance with some embodiments. The wireless charger 400 may be similar to the wireless charger 230 of FIGS. 2A-D. As seen in FIG. 4, the wireless charger may include a storage cell 410 (e.g., a battery) placed within a housing 420.

The housing 420 may be at least 5 cm in length and width or at most 5 cm in length and width.

In some embodiments, the storage cell 410 may be a lithium ion battery. In some embodiments, the storage cell may have at least 2,000 mAh units of electric charge.

The wireless charger 400 may utilize Qi technology or a similar technology for wireless charging of an external electronic device. Qi technology may use induction to transfer energy from the storage cell 410 to the external device. In some embodiments, the wireless charger 400 may have at least 5 W of power. In some embodiments, the wireless charger 400 may have up to 5 W of power.

Figure 8:
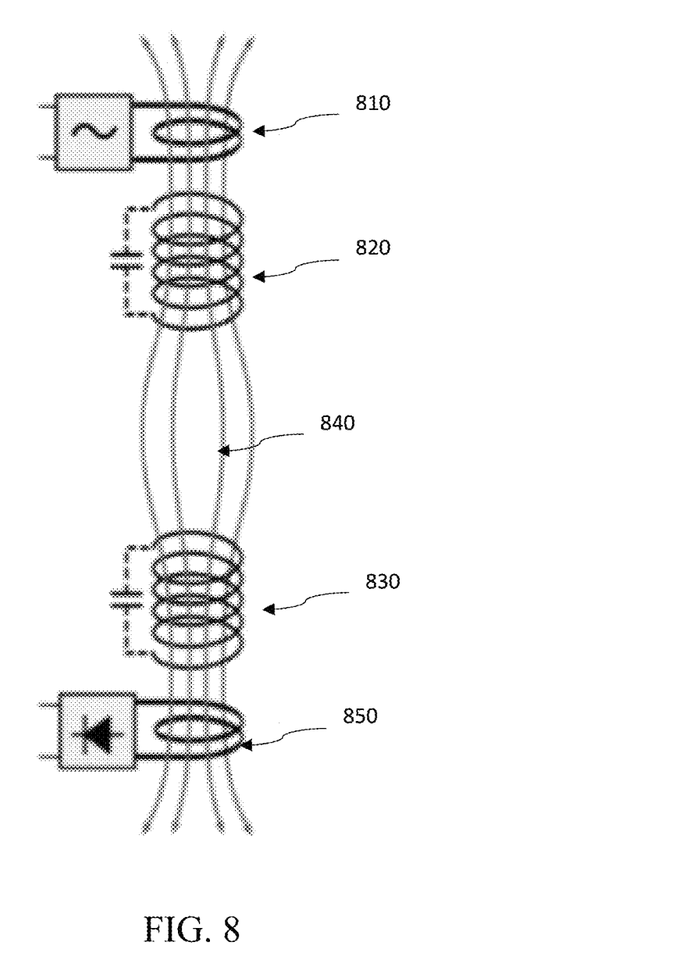
FIG. 8 illustrates a method of inductive coupling energy transfer in accordance with one embodiment.

In operation, current may be generated by the motion of a magnet in the inductor(s) (shown in FIG. 6 and FIG. 8). In some embodiments, the magnet may be a neodymium magnet. This current may then be transferred and stored as electrical energy within the wireless charger 400.

The wireless charger 400, when attached to the generator (shown in FIGS. 2A, B, and D), may act as an electrical energy storage unit. Once the wireless charger 400 has received and stored electrical energy, the wireless charger 400 may be detached from the generator. The wireless charger 400 may be configured to store a maximum amount of electrical energy. However, the wireless charger may not need to store the maximum amount of electrical energy before being detached from the generator or before beginning to charge an external electronic device. In some embodiments, the wireless charger 400 and the generator may be integrated into a single unit.

In some embodiments, the housing 420 of the wireless charger 400 may have one or more non-slip surfaces. For example, a surface of the housing 420 of the detachable wireless charger 400 may comprise PU Gel and/or Nano-suction technology. The non-slip surface may enable improved placement of the external device receiving power from the wireless charger 400. The non-slip surface and improved placement may enable better placement of a receiver coil of the external device, such that energy may be transferred from the wireless charger 400 to the external device through inductive coupling.

Figures 5A, 5B:
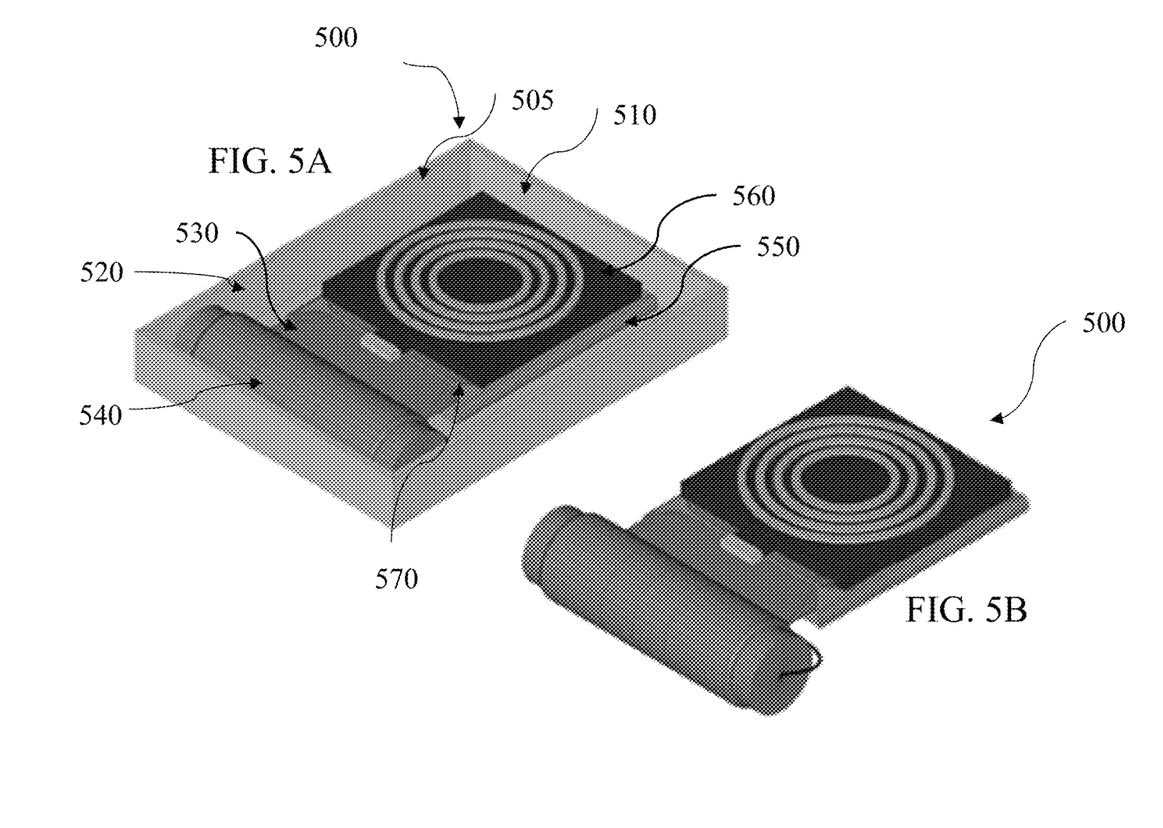
FIG. 5A illustrates a single inductor power unit in a housing in accordance with one embodiment.
FIG. 5B illustrates the single inductor power unit of FIG. 5A without a housing in accordance with one embodiment.
Figures 5C, 5D:
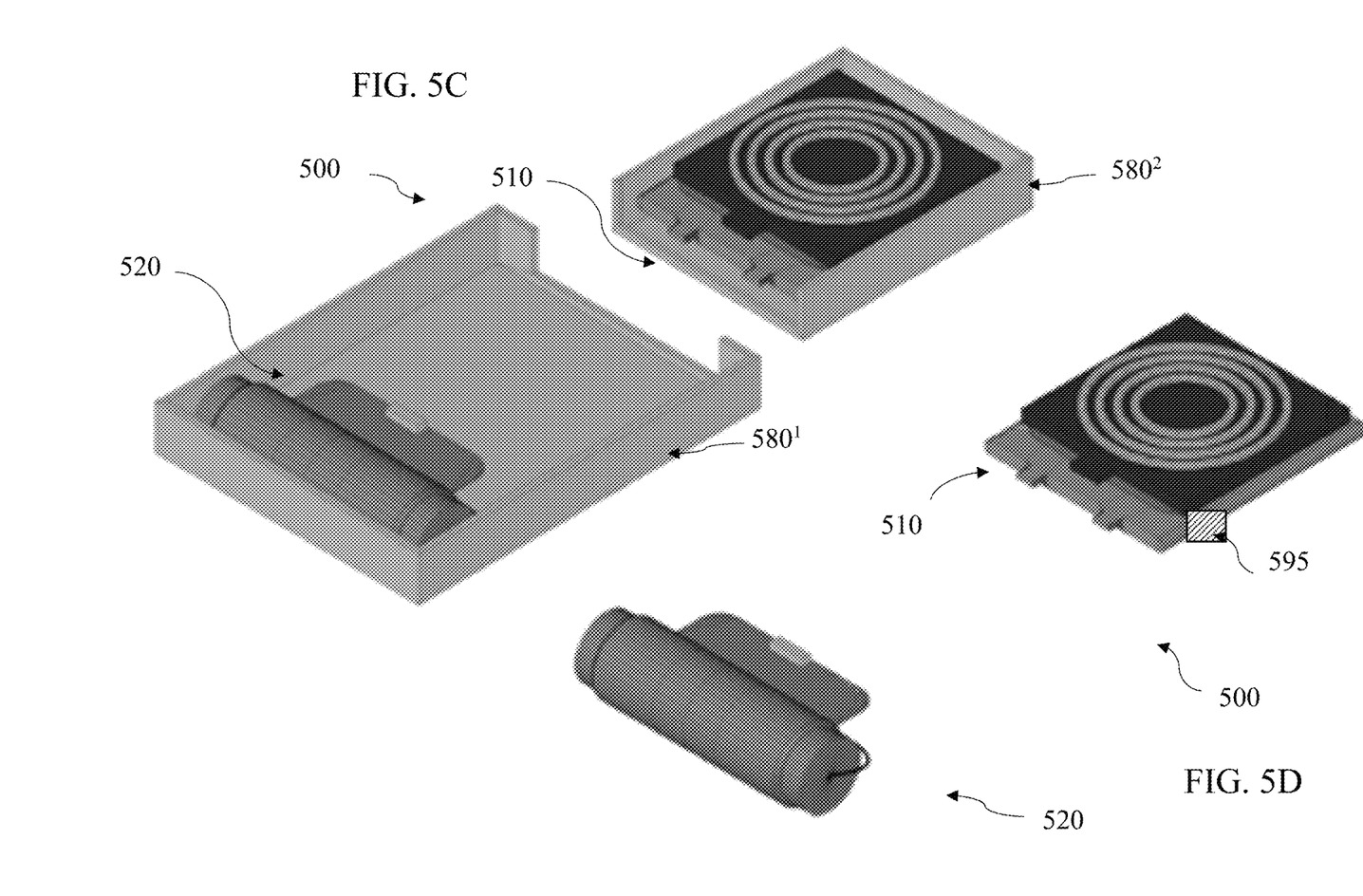
FIG. 5C illustrates the single inductor power unit of FIGS. 5A and B in a housing in a detached form in accordance with one embodiment.
FIG. 5D illustrates the single inductor power unit of FIGS. 5A-C in a detached form without the housing in accordance with one embodiment.

FIG. 5A illustrates a single inductor power unit 500 in a housing 505 in accordance with one embodiment. FIG. 5B illustrates the single inductor power unit 500 of FIG. 5A without a housing in accordance with one embodiment. FIG. 5C illustrates the single inductor power unit 500 of FIGS. 5A-B in a detached form with a housing 580 in accordance with one embodiment. FIG. 5D illustrates the single inductor power unit 500 of FIGS. 5A-C in a detached form without a housing in accordance with one embodiment.

In some embodiments, the single inductor power unit 500 comprises a wireless charger 510 and an electrical generator 520 in operable connectivity with the wireless charger 510. In some embodiments, the electrical generator 520 comprises a printed circuit board 530 and an inductor 540.

The wireless charger 510 may comprise a battery or other storage cell 550 and a wireless transmitter 560. In some embodiments, the wireless transmitter 560 may be attached to a printed circuit board 570.

As shown in FIG. 5C, the electrical generator 520 may be secured within housing 580' that is detachable from the housing 580$^2$ of the wireless charger 510. In some embodiments, the electrical generator 520 is detachable from and reattachable to the wireless charger 510, as shown in FIG. 5D.

The detachable housing unit components 505, 580', 580$^2$ may have one or more non-slip surfaces. In some embodiments, only some of the housing unit components are covered in a non-slip surface, which may comprise PU Gel and/or Nano-suction technology. However, the non-slip surface may be made of any of a plurality of materials, as would be recognized by one skilled in the art. In some embodiments, the non-slip surface may be configured such that the surface can be used to position an external device when the external device is receiving energy from the wireless charger. For example, an optimal position of an external device may exist to receive energy from the wireless charger 510 through inductive coupling.

As with embodiments discussed above, the power unit 500 may also include a switching sensor 595. The switching sensor 595 may detect when the wireless charger 510 is in operable connectivity with an external receiver receiving charge.

The switching sensor 595 may enable the transfer of energy to the external receiver upon detecting that the wireless charger 510 is in operable connectivity with the external receiver (e.g., within a predetermined distance from the external receiver). Similarly, the switching sensor 595 may stop the transfer of energy upon detecting the wireless charger 510 is not in operable connectivity with the external receiver (e.g., outside a predetermined distance from the external receiver). The switching sensor 595 may then resume the transfer of energy to the external receiver upon detecting that the wireless charger 510 has resumed operable connectivity with the external receiver. In some embodiments, the switching sensor 595 may operate when the wireless charger 510 is attached to the electrical generator 520 and when the wireless charger 510 is detached from the electrical generator 520.

The switching sensor 595 may be configured to automatically start/stop the transfer of energy. In some embodiments, the switching sensor 595 may be manually activated. In some embodiments, the switching sensor 595 may be located on the housing unit 580.

FIG. 6 illustrates an inductor 600 having a central magnet 610 and inductor coil 620 in accordance with some embodiments. The inductor 600 may be similar to the inductors 330$^1$, 330$^2$, 340$^1$, 340$^2$, 540 of FIGS. 2A-D and 5A-D.

In some embodiments, the inductor 600 may include an external housing 630. The inductor coil 620 may be wrapped around the inner core 640 of the inductor 600. The inductor coil 620 may be wound around the inner core 640 in a plurality of coil turns. In some embodiments, the inner core 640 may comprise at least one of plastic (PLA), or ferromagnetic material comprising iron, cobalt, nickel, or magnetite.

The inductor 600 may have a centrally located neodymium magnet 610, an end cap magnet 650, and/or a plurality of end cap magnets 650 and 660. The magnets 610, 650, and 660 may have north and south poles and may be arranged such that each magnet 610, 650, and 660 may repel the adjacent magnets 610, 650, and 660 in the inductor 600.

In some embodiments, the central neodymium magnet 610 may be suspended in the inner core 640 of the inductor 600. In some embodiments, the end cap magnets 650, 660 may be fixed in the inner core 640 of the inductor 600. The neodymium magnet 610 may also move within the inner core 640 upon movement of the inductor 600. This motion may cause current to be generated within the inductor 600.

A detachable storage cell or battery such as the cell 270 of FIGS. 2A-D may be charged through induced current generated by movement of the neodymium magnet 610, which causes electromagnetic induction. Current may be generated due to motion in only one direction or motion in a plurality of axes.

The neodymium magnet 610 may have a length of at least 10 mm or a maximum length of 10 mm. In some embodiments, a cylindrical neodymium magnet 610 may have a diameter of 1.5 cm or 2 cm. In some embodiments, the neodymium magnet 610 is a spherical magnet and may have a diameter of at least 2 cm. In some embodiments, the length of the neodymium magnet 610 is, at most, one-third the length of the inductor 600.

Figure 7:
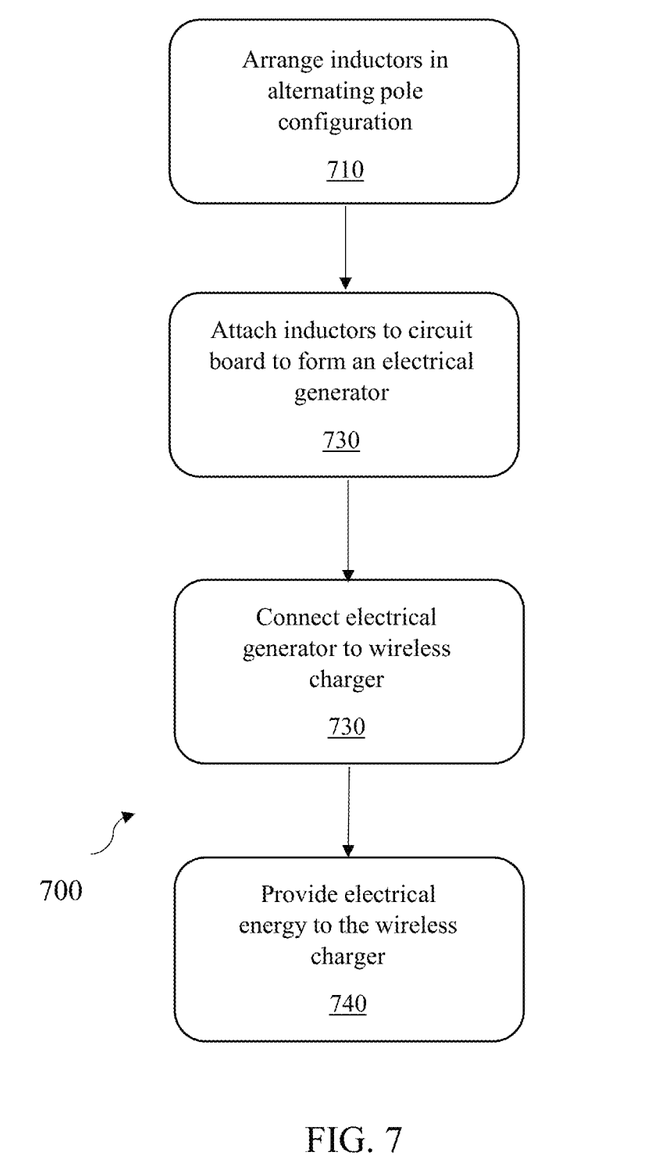
FIG. 7 depicts a flowchart of a method to generate energy and charge a device in accordance with one embodiment.

FIG. 7 depicts a flowchart of a method 700 of generating energy and charging a device in accordance with one embodiment. In some embodiments, the method 700 may involve arranging a plurality of inductors in an alternating pole configuration in step 710 to reduce interference between inductors.

Each of the plurality of inductors may include a number of coil turns. In some embodiments, each of the plurality of inductors may be a cylindrical inductive coil. These inductors may be similar to the inductor 600 of FIG. 6, for example.

Then, method 700 may involve attaching the plurality of inductors to a circuit board in step 720, wherein the plurality of inductors and circuit board form an electrical generator. In some embodiments, the electrical generator may then be connected to a wireless charger in step 730, such that the electrical generator is in operable connectivity with the wireless charger and is configured to provide electrical energy to the wireless charger in step 740. In some embodiments, the electrical generator may be in operable connectivity with a storage cell housed in the wireless charger.

In further embodiments, the electrical energy may then be provided to an external device to charge the external device. The wireless charger may be configured to transfer energy to an external device having an external receiver configured to receive energy through, e.g., induction. For example, the external receiver may be a cell phone.

FIG. 8 illustrates a method of transferring energy through inductive coupling in accordance with one embodiment. As discussed above, an electrical generator may convert kinetic energy into electrical energy using at least one inductor. This energy may then be transferred to a storage cell.

In some embodiments, this storage cell may be a detachable wireless battery such as those described above. The storage cell may be connected to a wireless energy transmitter using the Qi standard.

In some embodiments, the housing unit of the power unit may use PU Gel and/or Nano-suction to facilitate the placement of the storage cell with respect an external receiver. The receiver may be configured to receive energy transmitted by the wireless charger comprising the battery. In some embodiments, once the storage cell is operably connected to the external receiver, a sensor may activate the storage cell to begin charging the external receiver.

Referring back to FIG. 8, energy 810 may be transferred to a first coil 820 from a storage cell. The inductive coupling energy transfer, sometimes referred to as electromagnetic induction or electromagnetic induction transfer, may occur when power is transferred between a first coil 820 of wire and a second coil 830 of wire by a magnetic field. The first coil 820 of wire may be a transmitter coil and the second coil of 830 wire may be a receiver coil.

In some embodiments, an alternating current may pass through the first coil 820 and create an oscillating magnetic field 840. The magnetic field 840 may then pass through the second coil 830, inducing an alternating current in the receiver that may be, e.g., processed through a rectifier or other regulator and used to power or charge an external receiver equipped to receive the current.

Figure 9A:
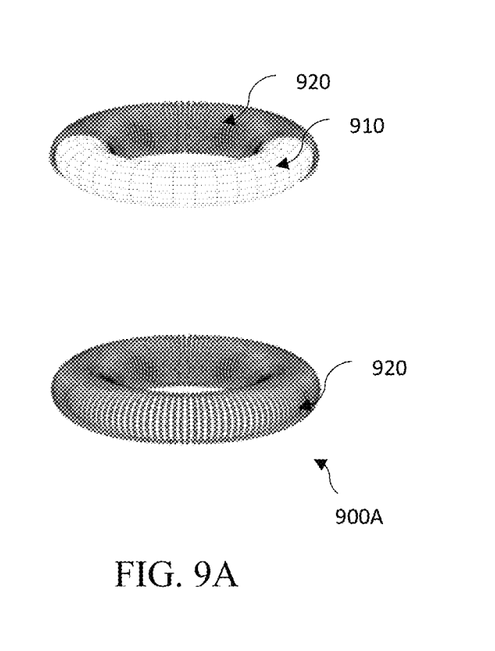
FIG. 9A illustrates an inductor arranged in a toroidal conformation in accordance with one embodiment.
Figure 9B:
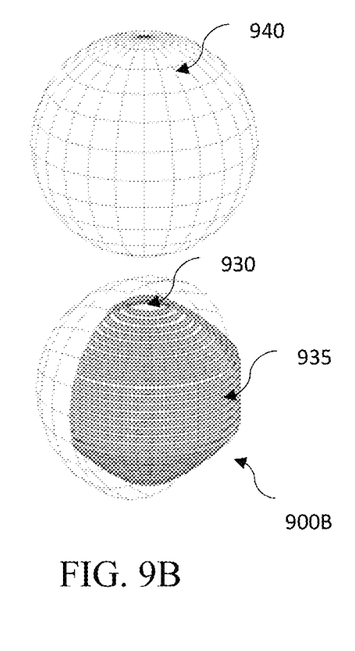
FIG. 9B illustrates an inductor arranged in a spherical conformation in accordance with one embodiment.
Figure 9C:
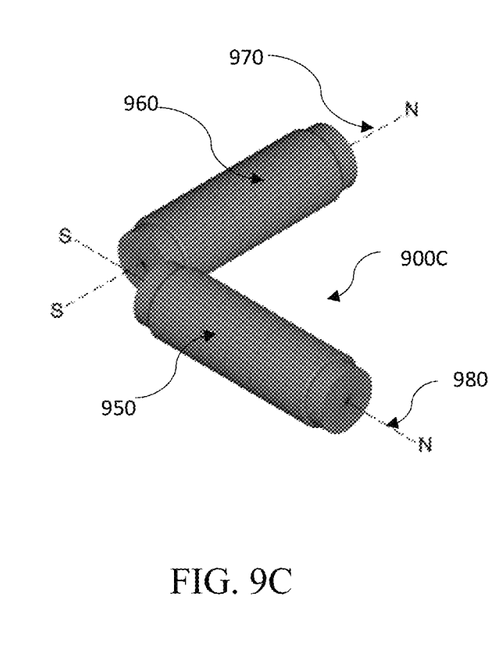
FIG. 9C illustrates a plurality of inductors arranged in a vertical and horizontal axis conformation in accordance with one embodiment.

FIG. 9A illustrates an inductor 900A arranged in a toroidal conformation in accordance with one embodiment. FIG. 9B illustrates an inductor 900B arranged in a spherical conformation in accordance with one embodiment. FIG. 9C illustrates a plurality of inductors 900C arranged in a vertical and horizontal axis conformation in accordance with one embodiment.

As seen in FIG. 9A, an inductor 900A or a plurality of inductors 900A may be arranged in a toroidal conformation. The inductor core 910 may be shaped in a torus shape and surrounded by a metal coil 920. In some embodiments, the metal coil 920 may comprise copper. Kinetic energy resulting from movement of the inductor core 910 may be converted to electrical energy by generating a current through the metal coil 920.

As seen in FIG. 9B, a spherical magnet 930 may be surrounded by a metal coil 935 in a spherical conformation. The spherical magnet 930 and metal coil 935 may be encased in an outer housing 940. In some embodiments, the spherical magnet 930 may be suspended inside the metal coil 935 and may move in a plurality of directions within the metal coil 935. The spherical inductor conformation 900B may generate electrical energy from movement in the x, y, and z planes. The kinetic energy from the movement in all directions may produce electrical energy by generating a current through the metal coil 935.

As seen in FIG. 9C, a first inductor 950 may be positioned at an angle to a second inductor 960. The inductors 950, 960 may be positioned such that their central axes 970, 980 may form a right angle. The arrangement of inductors 950, 960 at an angle may enable energy harvesting from two planes of motion. The first inductor 950 may enable energy harvesting along a first axis 980 and the second inductor 960 may enable energy harvesting along a second axis 970.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A power unit comprising:
   a wireless charger; and
   an electrical generator in operable connectivity with the wireless charger, the electrical generator configured to:
   receive a first kinetic energy from motion of the electrical generator in each of a plurality of directions;
   convert the first kinetic energy into electrical energy, and
   provide the electrical energy to the wireless charger;
   wherein the electrical generator includes a coil arrangement that enables the electrical generator to convert the first kinetic energy into a uniform amount of electrical energy in each of the plurality of directions.

2. The power unit of claim 1 wherein the coil arrangement includes a spherical, elliptical, or toroidal conformation.

3. The power unit of claim 1 further comprising a plurality of inductors arranged in an alternating pole configuration, wherein each of the plurality of inductors has a length of at least 30 mm.

4. The power unit of claim 1 further comprising a plurality of inductors arranged in an alternating pole configuration, wherein a core material of each of the plurality of inductors is comprised of at least one of plastic (PLA) or a ferromagnetic material including at least one of iron, cobalt, nickel, or magnetite.

5. The power unit of claim 1 further comprising a plurality of inductors arranged in an alternating pole configuration, wherein each of the plurality of inductors includes at least one centrally located neodymium magnet.

6. The power unit of claim 5 wherein the at least one centrally located neodymium magnet has a length of at least 10 mm.

7. The power unit of claim 1 wherein the power unit is portable.

8. The power unit of claim 1 further comprising a storage cell, wherein the generator provides the electrical energy to the wireless charger through the storage cell.

9. The power unit of claim 1 wherein the wireless charger is detachable from the electrical generator.

10. The power unit of claim 1 wherein the wireless charger is configured to transfer energy to an external receiver through induction.

11. The power unit of claim 10 further comprising a switching sensor, wherein the switching sensor is configured to:
   detect when the wireless charger is in operable connectivity with the external receiver;
   enable the transfer of energy to the external receiver upon detecting the wireless charger is in operable connectivity with the external receiver; and
   stop the transfer of energy upon detecting the wireless charger is not in operable connectivity with the external receiver.

12. The power unit of claim 1 wherein at least one of the wireless charger and the electrical generator has at least one external surface at least partially configured with a non-slip material.

13. A method of manufacturing a power unit, the method comprising:
   arranging a plurality of inductors in an alternating pole configuration;
   arranging at least one coil with the plurality of inductors in an arrangement configured to receive a first kinetic energy from motion of the power unit in each of a plurality of directions and convert the first kinetic energy into a uniform amount of electrical energy in each of the plurality of directions;
   attaching the plurality of inductors to a circuit board, wherein the plurality of inductors and the circuit board form an electrical generator; and
   connecting the electrical generator to a wireless charger, such that the electrical generator is in operable connectivity with the wireless charger and is configured to provide electrical energy to the wireless charger.

14. The method of claim 13 wherein the wireless charger is detachable from the electrical generator.

15. The method of claim 13 wherein the coil arrangement includes a-spherical, elliptical, or toroidal conformation.

16. The method of claim 13 wherein each of the plurality of inductors has a length of at least 30 mm.

17. The method of claim 13 wherein a core material of each of the plurality of inductors is comprised of at least one of plastic (PLA), or a ferromagnetic material including at least one of iron, cobalt, nickel, or magnetite.

18. The method of claim 13 wherein each of the plurality of inductors includes at least one centrally located neodymium magnet.

19. The method of claim 13 further comprising connecting the electrical generator to a storage cell.

20. The method of claim 13 wherein the wireless charger is configured to transfer energy to an external receiver through induction.

21. The method of claim 20 wherein the external receiver is a cell phone.

22. A power unit comprising:
   a wireless charger; and
   an electrical generator in operable connectivity with the wireless charger, the electrical generator configured to:
   receive a first kinetic energy from motion of the electrical generator in each of a plurality of directions;
   convert the first kinetic energy into electrical energy, and
   provide the electrical energy to the wireless charger;
   wherein the electrical generator is detachable from and reattachable to the wireless charger and includes a coil arrangement that enables the electrical generator to convert the first kinetic energy into a uniform amount of electrical energy in each of the plurality of directions.

* * * * *